United States Patent
Okpisz et al.

(10) Patent No.: US 6,209,073 B1
(45) Date of Patent: Mar. 27, 2001

(54) SYSTEM AND METHOD FOR INTERLOCKING BARRIER OPERATIONS IN LOAD AND STORE QUEUES

(75) Inventors: Alexander Edward Okpisz; Thomas Albert Petersen; Amy May Tuvell, all of Austin, TX (US); Ronny Lee Arnold, Fort Collins, CO (US)

(73) Assignees: International Business Machines Corp., Armonk, NY (US); Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/066,961

(22) Filed: Apr. 27, 1998

(51) Int. Cl.[7] ............................. G06F 12/08; G06F 9/08
(52) U.S. Cl. ..................... 711/169; 711/167; 712/216
(58) Field of Search .................... 711/154, 163, 711/167, 169; 712/216

(56) References Cited

U.S. PATENT DOCUMENTS

| | | |
|---|---|---|
| 4,858,116 | 8/1989 | Gillett, Jr. et al. ................. 364/200 |
| 4,941,083 | 7/1990 | Gillett, Jr. et al. ................. 364/200 |
| 5,341,491 | 8/1994 | Ramanujan .......................... 395/425 |
| 5,465,336 | 11/1995 | Imai et al. ........................... 395/375 |
| 5,490,261 | 2/1996 | Bean et al. .......................... 395/448 |
| 5,649,137 | 7/1997 | Favor et al. ........................ 395/383 |
| 5,655,096 | 8/1997 | Branigan ............................. 395/376 |

OTHER PUBLICATIONS

*Compile–Time Elimination of Store–Fetch Interlock Delays*, IBM Technical Disclosure Bulletin, vol. 37 No. 10, Oct. 1994, pp. 217–218.

*Dual Load/Store Unit with a Single Port Cache*, IBM Technical Disclosure Bulletin, vol. 38 No. 08, Aug. 1995, pp. 11–15.

*Primary Examiner*—Kevin L. Ellis
(74) *Attorney, Agent, or Firm*—Kelly K. Kordzik; Winstead Sechrest & Minick P.C.; Anthony V. S. England

(57) ABSTRACT

Storage access blocking instructions, such as the EIEIO instruction implemented within the PowerPC architecture, block other storage access instructions at the bus interface stage as opposed to the execute stage. Therefore, cacheable instructions, and other similar instructions, are allowed to complete without being blocked by such an EIEIO instruction not ordered by the EIEIO instruction.

21 Claims, 9 Drawing Sheets

FIG. 9

Store

| e | op |
|---|---|
| 1 | EIEIO1 |
| 2 | STORE1 |
| 3 | STORE2 |
| 4 | EIEIO2 |
| 5 | STORE3 |
| | |

Load

| e | r | op |
|---|---|---|
| 0 | 1 | LD1 |
| 3 | 1 | LD2 |
| 7 | 4 | LD4 |
| 1 | | LD5 |
| 2 | | LD6 |
| | | |
| | | |
| | | |

FIG. 10

Store

| e | op |
|---|---|
| 1 | EIEIO1 |
| 2 | STORE1 |
| 3 | STORE2 |
| 4 | EIEIO2 |
| 5 | STORE3 |
| 6 | EIEIO3 |

Load

| e | r | op |
|---|---|---|
| 0 | 1 | LD1 |
| 3 | 1 | LD2 |
| 7 | 4 | LD4 |
| 1 | 6 | LD5 |
| 2 | 6 | LD6 |
| | | |
| | | |
| | | |

FIG. 11

Store

| e | op |
|---|------|
| 1 | EIEIO1 |
| 2 | STORE1 |
| 3 | STORE2 |
| 4 | EIEIO2 |
| 5 | STORE3 |
| 6 | EIEIO3 |

Load

| e | r | op |
|---|---|-----|
| 0 | 1 | LD1 |
| 3 | 1 | LD2 |
| 7 | 4 | LD4 |
| 1 | 6 | LD5 |
| 2 | 6 | LD6 |
| 4 |   | LD7 |
|   |   |     |
|   |   |     |

FIG. 12

Store

| e | op |
|---|------|
|   |    |
| 2 | STORE1 |
| 3 | STORE2 |
| 4 | EIEIO2 |
| 5 | STORE3 |
| 6 | EIEIO3 |

Load

| e | r | op |
|---|---|-----|
|   |   |     |
|   |   |     |
| 7 | 4 | LD4 |
| 1 | 6 | LD5 |
| 2 | 6 | LD6 |
| 4 |   | LD7 |
|   |   |     |
|   |   |     |

SYSTEM AND METHOD FOR INTERLOCKING BARRIER OPERATIONS IN LOAD AND STORE QUEUES

TECHNICAL FIELD

The present invention relates in general to data processing systems, and in particular, to the execution of instructions within a microprocessor.

BACKGROUND INFORMATION

Certain processors (such as the PowerPC processor) bus serialize blocking instructions such as EIEIO (enforce in-order execution of I/O) which itself serializes storage accesses at their outgoing queues. Typically when an EIEIO instruction is executed, all storage access operations posted prior to the execution of the EIEIO instruction are marked for performance on the bus before any storage accesses that may be posted subsequent to the execution of the EIEIO instruction. Although the processor will not necessarily perform these transactions on the bus immediately, the programmer is assured that they will be performed on the bus before any subsequently posted storage accesses. In other words, the EIEIO instruction forces all EIEIO ordered storage accesses to finish on the bus before the EIEIO instruction releases to the bus. EIEIO completion on the bus allows EIEIO ordered storage accesses behind the EIEIO instruction access to the bus. In general, this can be applied to any instruction which orders some but not all subsequent instructions.

As an example of the benefit of such an instruction, assume that the programmer must write two parameter words, read a status register and then one command word to a fixed-disk controller and that the controller's ports are implemented as memory/mapped I/O ports. If the programmer executes the three stores and one load in order, the processor will post the writes but not perform them immediately. In addition, when it does acquire the external bus and performs the memory write or read transactions, it may not perform them in the same order as that specified by the programmer. This might result in improper operation of the disk controller (because it might receive the command word before the parameters and proceed to execute the command using old parameters).

To ensure that the first two stores (to write the parameter words to the disk controller) are performed prior to the store of the command word, the programmer should follow the first two stores with an EIEIO instruction. This would mark these two stores for performance on the bus prior to any subsequently posted writes. The third store (to the command register) would be executed after the EIEIO instruction and posted in the write queue. When the processor's system interface performs the three memory write transactions, the first two stores will be performed before the third one.

The problem with such typical EIEIO instructions is that they execute serially above the bus interface, as illustrated in FIG. 2. The EIEIO instruction blocks all subsequent instructions from executing until the EIEIO completes its bus activity. As a result, cache hit loads (e.g., LD3) not ordered by the EIEIO instruction wait unnecessarily behind the serially executed EIEIO.

FIG. 3 provides a simple illustration of that portion of a microprocessor pertaining to storage accesses. Instructions arrive at the execution unit(s) 301, which may require storage accesses through the load/store unit 28, which will contain a load queue 302 and a store queue 303. The load and store instructions are queued for transfer to the bus interface unit 12 coupled to the bus 11, which provides access to the main memory system 39 (see FIG. 1).

As discussed above, prior art EIEIO-type instructions block all subsequent instructions from executing at the execution stage. When the EIEIO instruction is sent down out of execution, then no other storage access type instructions, including further EIEIO instructions, can be sent to data cache 16. Consequently, storage access instructions, which could be satisfied by access to data cache 16 and do not require the considerably longer access to main memory 39, are also blocked by the EIEIO instruction at the execution stage. As an example, in FIG. 2, Group 1 illustrates load instructions LD1 and LD2, followed by an EIEIO instruction EIEIO1 serially programmed in three consecutive clock cycles. The typical EIEIO instruction then provides a block to subsequent storage access instructions at the execute stage. Store instructions ST1 and ST2 and load instructions LD3 and LD4, along with the second EIEIO instruction, EIEIO2, are not permitted to execute until some undetermined number of clock cycles m when the instructions LD1 and LD2 have been fully executed and completed over the bus 11.

In this example, load instruction LD3 is a cacheable load that can execute and hit on data cache 16. However, with the prior art EIEIO instruction configuration, the execution of instruction LD3 will also have to wait the indeterminate number of clock cycles m.

As a result, there is a need in the art for an improvement over the above scenario.

SUMMARY OF THE INVENTION

The present invention addresses the foregoing need by providing that EIEIO-type instructions block at the bus interface queues and not at the execution stage. The present invention implements the EIEIO instructions within the store queue when the store queue strongly orders storage accesses. However, the converse situation may be implemented whereby the EIEIO instructions are ordered within the load queue. The barrier function provided by the EIEIO instruction is implemented in the load queue via pointers back to locations in the store queue. The store queue by its nature automatically orders the stores with respect to the EIEIO instruction. The store queue sends a barrier valid and reference value to perform ordering in the load queue. A given load entry cannot arbitrate for the bus if the barrier valid asserts and its store reference does not equal the barrier reference value. The load queue informs the store queue that no load accesses match the barrier reference value. The "no match" loads include loads with a valid reference that do not equal the barrier reference value and loads without a valid reference. A "no match" load queue allows the store queue to run the EIEIO instruction on the bus.

An advantage of the present invention is that it allows the processor to perform additional instructions, such as cacheable load instructions.

Another advantage of the present invention is that the EIEIO instructions of the present invention order storage accesses downstream but do not block the processor from executing other instructions not ordered by the EIEIO instruction.

Yet another advantage of the present invention is that it allows additional EIEIO instructions to be executed and provide subsequent barriers ensuring ordering of multiple groups of storage instructions.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 5–14 illustrate an example of an embodiment of the present invention.

DETAILED DESCRIPTION

Figure 1:
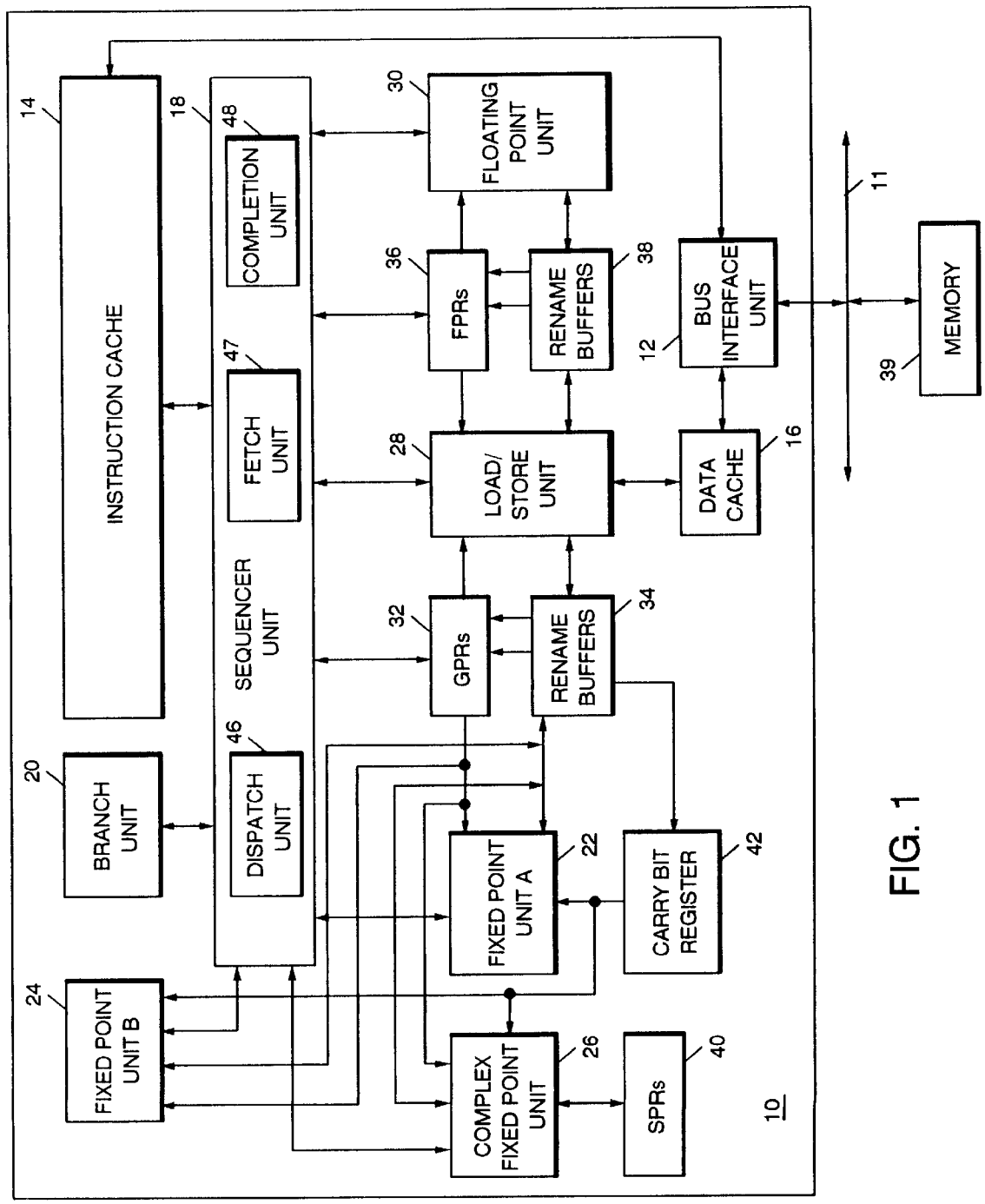
FIG. 1 illustrates a data processing system configured in accordance with the present invention.

In the following description, numerous specific details are set forth such as specific word or byte lengths, etc. to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 is a block diagram of a processor 10 system for processing information according to one embodiment. Processor 10 may be an in-order machine or an out-of-order machine. Processor 10 is a single integrated circuit superscalar microprocessor, such as the PowerPC™ processor from IBM Corporation, Austin, Tex. Accordingly, as discussed further hereinbelow, processor 10 includes various units, registers, buffers, memories, and other sections, all of which are formed by integrated circuitry. Processor 10 operates according to reduced instruction set computing ("RISC") techniques. As shown in FIG. 1, a system bus 11 is connected to a bus interface unit ("BIU") 12 of processor 10. BIU 12 controls the transfer of information between processor 10 and system bus 11.

BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46, a fetch unit 47, and a completion unit 48, the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42.

FXUA 22, FXUB 24, CFXU 26 and LSU 28 output results (destination operand information) of their operations for storage at selected entries in fixed point rename buffers 34. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

In response to a Load instruction, LSU 28 inputs information from data cache 16 and copies such information to selected ones of rename buffers 34 and 38. If such information is not stored in data cache 16, then data cache 16 inputs (through BIU 12 and system bus 11) such information from a system memory 39 connected to system bus 11. Moreover, data cache 16 is able to output (through BIU 12 and system bus 11) information from data cache 16 to system memory 39 connected to system bus 11. In response to a Store instruction, LSU 28 inputs information from a selected one of GPRs 32 and FPRs 36 and copies such information to data cache 16.

Sequencer unit 18 inputs and outputs information to and from GPRs 32 and FPRs 36. From sequencer unit 18, branch unit 20 inputs instructions and signals indicating a present state of processor 10. In response to such instructions and signals, branch unit 20 outputs (to sequencer unit 18) signals indicating suitable memory addresses storing a sequence of instructions for execution by processor 10. In response to such signals from branch unit 20, sequencer unit 18 inputs the indicated sequence of instructions from instruction cache 14. If one or more of the sequence of instructions is not stored in instruction cache 14, then instruction cache 14 inputs (through BIU 12 and system bus 11) such instructions from system memory 39 connected to system bus 11.

In response to the instructions input from instruction cache 14, sequencer unit 18 selectively dispatches through a dispatch unit 46 the instructions to selected ones of execution units 20, 22, 24, 26, 28 and 30. Each execution unit executes one or more instructions of a particular class of instructions. For example, FXUA 22 and FXUB 24 execute a first class of fixed point mathematical operations on source operands, such as addition, subtraction, ANDing, ORing and XORing. CFXU 26 executes a second class of fixed point operations on source operands, such as fixed point multiplication and division. FPU 30 executes floating point operations on source operands, such as floating point multiplication and division.

As information is stored at a selected one of rename buffers 34, such information is associated with a storage location (e.g., one of GPRs 32 or CA register 42) as specified by the instruction for which the selected rename buffer is allocated. Information stored at a selected one of rename buffers 34 is copied to its associated one of GPRs 32 (or CA register 42) in response to signals from sequencer unit 18. Sequencer unit 18 directs such copying of information stored at a selected one of rename buffers 34 in response to "completing" the instruction that generated the information through a completion unit 48. Such copying is called "writeback".

As information is stored at a selected one of rename buffers 38, such information is associated with one of FPRs 36. Information stored at a selected one of rename buffers 38 is copied to its associated one of FPRs 36 in response to signals from sequencer unit 18. Sequencer unit 18 directs such copying of information stored at a selected one of rename buffers 38 in response to "completing" the instruction that generated the information.

Processor 10 achieves high performance by processing multiple instructions simultaneously at various ones of execution units 20, 22, 24, 26, 28 and 30. Accordingly, each instruction is processed as a sequence of stages, each being executable in parallel with stages of other instructions. Such a technique is called "superscalar pipelining" An instruction is normally processed as six stages, namely fetch, decode, dispatch, execute, completion, and writeback.

In the fetch stage, sequencer unit 18 (fetch unit 47) selectively inputs (from instructions cache 14) one or more instructions from one or more memory addresses storing the sequence of instructions discussed further hereinabove in connection with branch unit 20 and sequencer unit 18.

In the decode stage, sequencer unit 18 decodes up to four fetched instructions.

In the dispatch stage, sequencer unit 18 selectively dispatches up to four decoded instructions to selected (in response to the decoding in the decode stage) ones of execution units 20, 22, 24, 26, 28 and 30 after reserving a rename buffer entry for each dispatched instruction's result (destination operand information) through a dispatch unit 46. In the dispatch stage, operand information is supplied to the selected execution units for dispatched instructions. Processor 10 dispatches instructions in order of their programmed sequence.

In the execute stage, execution units execute their dispatched instructions and output results (destination operand information) of their operations for storage at selected entries in rename buffers 34 and rename buffers 38 as discussed further hereinabove. In this manner, processor 10 is able to execute instructions out of order relative to their programmed sequence.

In the completion stage, sequencer unit 18 indicates an instruction is "complete" Processor 10 "completes" instructions in order of their programmed sequence.

In the writeback stage, sequencer 18 directs the copying of information from rename buffers 34 and 38 to GPRs 32 and FPRs 36, respectively. Sequencer unit 18 directs such copying of information stored at a selected rename buffer. Likewise, in the writeback stage of a particular instruction, processor 10 updates its architectural states in response to the particular instruction. Processor 10 processes the respective "writeback" stages of instructions in order of their programmed sequence. Processor 10 advantageously merges an instruction's completion stage and writeback stage in specified situations.

Although it would be desirable for each instruction to take one machine cycle to complete each of the stages of instruction processing, in most implementations, there are some instructions (e.g., complex fixed point instructions executed by CFXU 26) that require more than one cycle. Accordingly, a variable delay may occur between a particular instruction's execution and completion stages in response to the variation in time required for completion of preceding instructions.

The present invention blocks other instructions from executing at the bus interface subsequent to an EIEIO instruction (instructions are placed in the queues but not removed). The EIEIO instructions of the present invention are entered into the store queue because the store queue strongly orders storage accesses while the load queue does not. However, this choice of ordering the store queue over the load queue is implementation dependent. The barrier function associated with the EIEIO instruction is implemented in the load queue via pointers back to locations in the store queue. An example of this is illustrated with respect to FIGS. 5–14. The barrier is represented in FIGS. 5–14 as a heavy horizontal line between two load entries. Note that these figures illustrate the load and store queues 302 and 303 in various stages. The letter "e" refers to the entry number, while the letter "r" refers, or points, to an EIEIO instruction for each load instruction within the load queue 302.

Figure 5:
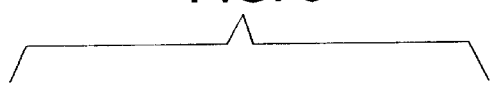
Figure 6:
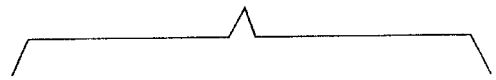

FIG. 5 illustrates the first step in the example, whereby load queue 302 receives and stores two load operations LD1 and LD2. In FIG. 6, a first EIEIO instruction, EIEIO1, arrives in the store queue 303. Load instructions LD1 and LD2 point to EIEIO1 requiring these load instructions to complete before the completion of EIEIO1. Note that the "r" bits of load instructions LD1 and LD2 refer to the "e" bit of EIEIO1.

Figure 7:
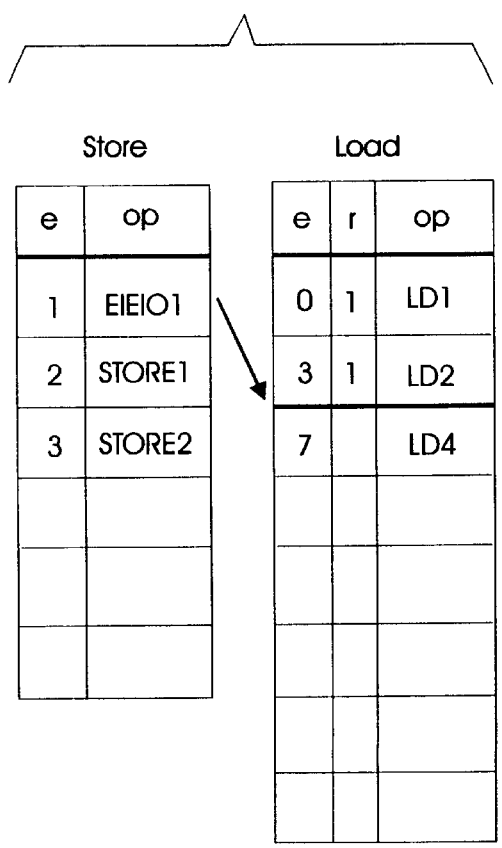
Figure 8:
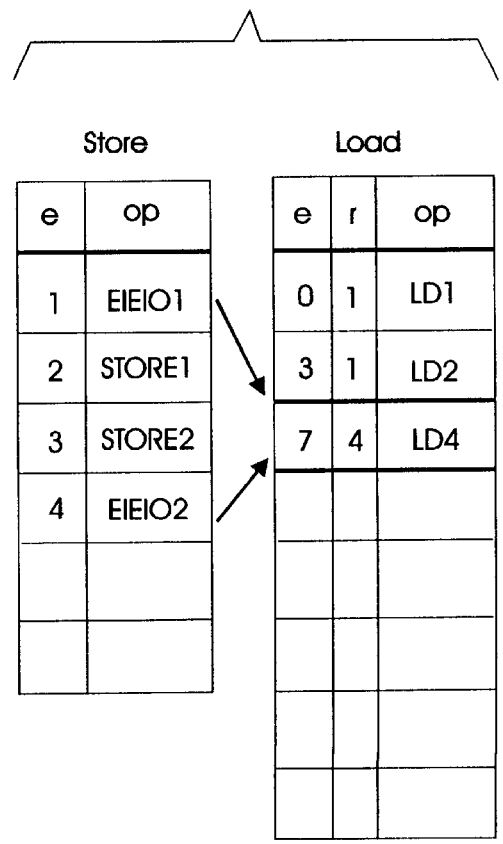

FIG. 7 illustrates the third step in this example whereby store instructions ST1 and ST2 are received within the store queue 303, and load instruction LD4 is stored in load queue 302. These three instructions will follow EIEIO1. FIG. 8 illustrates the next step in the example whereby another EIEIO instruction, EIEIO2, arrives in store queue 303. Load instruction LD4 points to EIEIO2 requiring LD4 to complete before EIEIO2.

FIG. 9 illustrates how store instruction ST3 and load instructions LD5 and LD6 are required to follow EIEIO2. Note how the "r" field of LD4 points to the "e" field of EIEIO2.

Next, in FIG. 10, EIEIO3 arrives in store queue 303. LD5 and LD6 point to EIEIO3 requiring these load instructions to complete before EIEIO3. Note the "r" fields pertaining to LD5 and LD6 point to the "e" field of EIEIO3.

Thereafter, in FIG. 11, LD7 is required to follow EIEIO3. In FIG. 12, load instructions LD1 and LD2 finish; therefore EIEIO1 in the store queue 303 can now complete.

Figure 13:
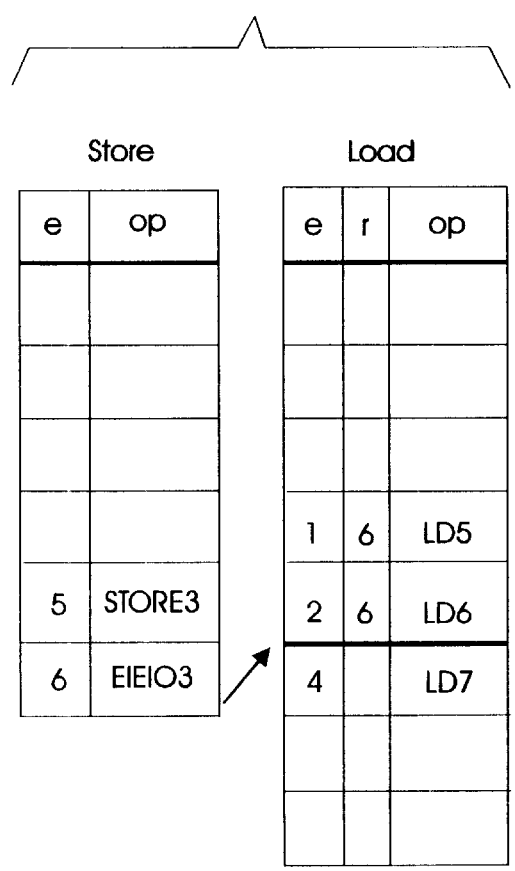

In FIG. 13, LD4, ST1, and ST2 finish; therefore EIEIO2 in the store queue 303 can now complete.

Figure 14:
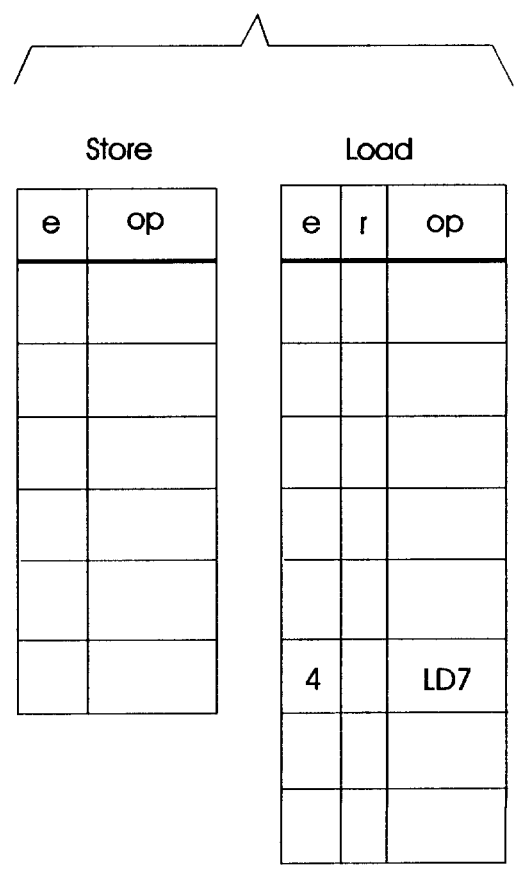

In FIG. 14, LD5, LD6 and ST3 finish; therefore EIEIO3 in store queue 303 can now complete.

As noted within FIGS. 5–14, the store queue 303 by its nature automatically orders the store instructions with respect to the EIEIO instructions.

Figure 2:
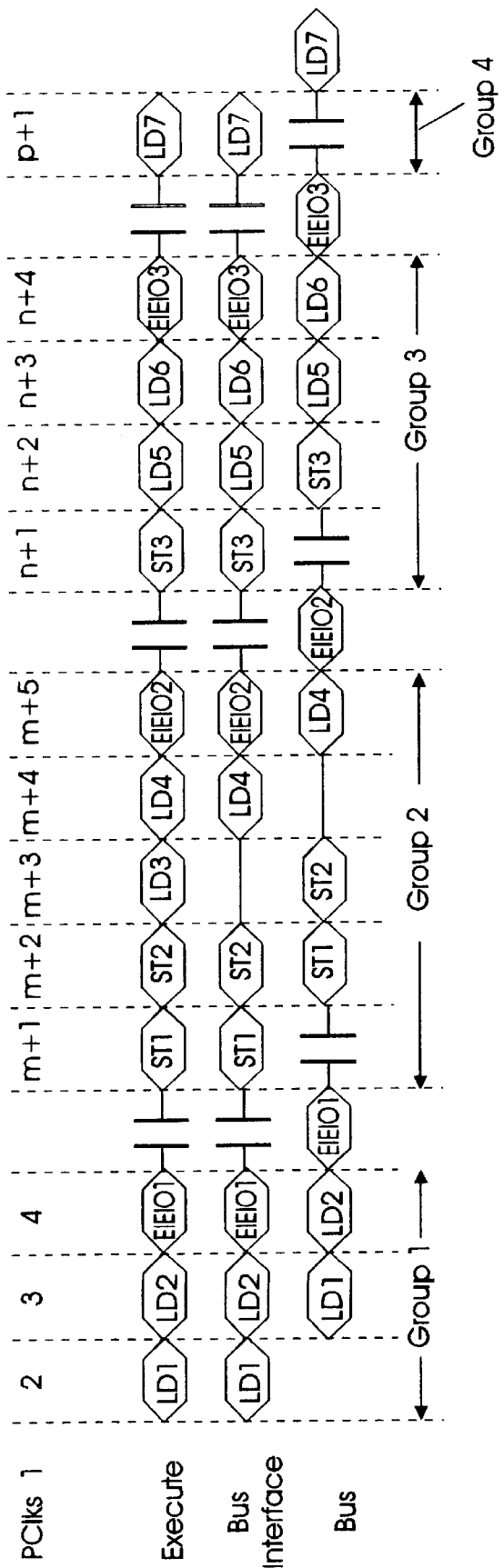
FIG. 2 illustrates a prior art process for blocking subsequent instructions with an EIEIO instruction.
Figure 3:
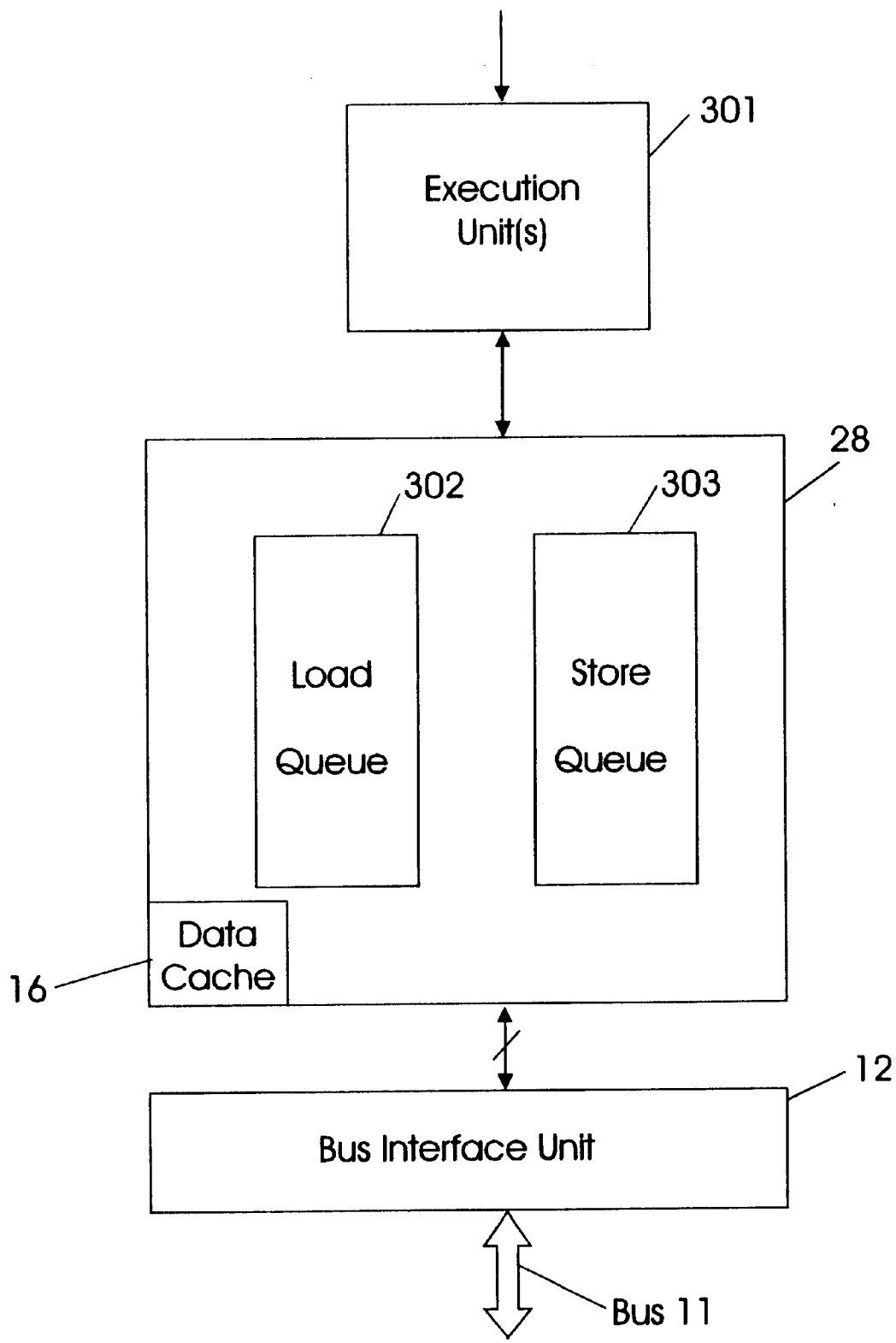
FIG. 3 illustrates a simplified block diagram of a portion of a data processing system.
Figure 4:
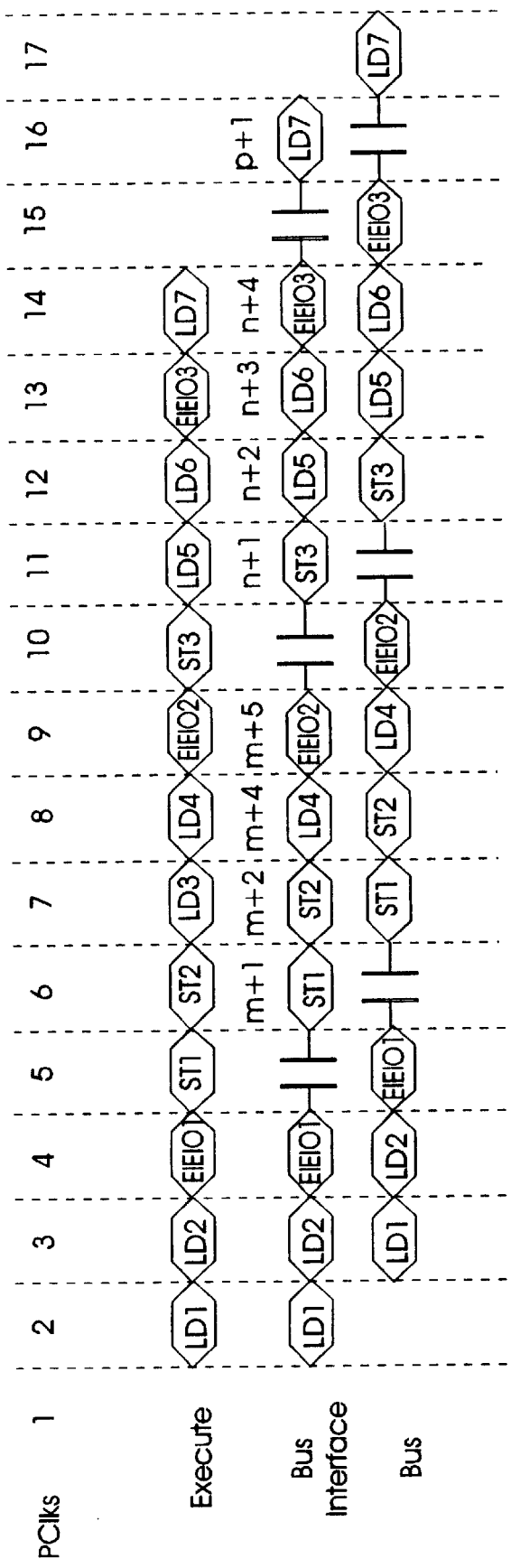
FIG. 4 illustrates the instruction blocking scheme implemented in accordance with the present invention.

Referring to FIG. 4, it can be readily seen that the present invention allows the processor to perform additional instructions, such as the load instruction LD3 referenced in FIG. 2 above, without being blocked by the EIEIO instructions. Since LD3 is not required to go the bus interface unit 12, it is permitted to execute without being blocked waiting for an EIEIO instruction to complete.

Although the present invention and its advantages have been described in detail, it should be understood that various changes, substitutions and alterations can be made herein without departing from the spirit and scope of the invention as defined by the appended claims.

What is claimed is:

1. A processor comprising:
   a load/store unit operable for storing a first storage access instruction and a storage access blocking instruction; and
   a pointer scheme operable for ordering the first storage access instruction to access a storage medium before the storage access blocking instruction, and not permitting a second storage access instruction to access the storage medium until after the storage access blocking instruction has completed, wherein accessing of the storage medium by the first and second storage access instructions involves accessing a memory system external to the processor via a bus interface unit, wherein a storage access instruction subsequent to the storage access blocking instruction but able to execute without requiring access to the memory system is not blocked by the storage access blocking instruction.

2. The processor as recited in claim 1, wherein the storage access instruction subsequent to the storage access blocking instruction but able to execute without requiring access to the memory system is cacheable to a cache coupled to the processor.

3. The processor as recited in claim 1, wherein the storage access instructions may be load or store instructions.

4. The processor as recited in claim 3, wherein the storage access blocking instruction is an EIEIO instruction.

5. A processor comprising:
a load/store unit operable for storing a first storage access instruction and a storage access blocking instruction; and
a pointer scheme operable for ordering the first storage access instruction to access a storage medium before the storage access blocking instruction, and not permitting a second storage access instruction to access the storage medium until after the storage access blocking instruction has completed, wherein the load/store unit includes a load queue and a store queue, wherein the storage access instructions are load and store instructions, wherein the storage access blocking instruction is an EIEIO instruction, wherein the store queue strictly orders the storage access instructions and the EIEIO instruction relative to each other, and wherein the pointer scheme: (1) requires any store instruction ordered before the EIEIO instruction to access the storage medium before completion of the EIEIO instruction; (2) requires any load instruction pointing to the EIEIO instruction to access the storage medium before completion of the EIEIO instruction; and (3) does not permit a subsequently ordered load instruction not pointing to the EIEIO instruction to access the storage medium before completion of the EIEIO instruction.

6. A processor comprising:
a load/store unit operable for storing a first storage access instruction and a storage access blocking instruction; and
a pointer scheme operable for ordering the first storage access instruction to access a storage medium before the storage access blocking instruction, and not permitting a second storage access instruction to access the storage medium until after the storage access blocking instruction has completed, wherein the load/store unit includes a load queue and a store queue, wherein the storage access instructions are load and store instructions, wherein the storage access blocking instruction is an EIEIO instruction, wherein the load queue strictly orders the storage access instructions and the EIEIO instruction relative to each other, and wherein the pointer scheme: (1) requires any load instruction ordered before the EIEIO instruction to access the storage medium before completion of the EIEIO instruction; (2) requires any store instruction pointing to the EIEIO instruction to access the storage medium before completion of the EIEIO instruction; and (3) does not permit a subsequently ordered store instruction not pointing to the EIEIO instruction to access the storage medium before completion of the EIEIO instruction.

7. A method for executing storage access instructions in a processor, comprising the steps of:
queuing a first load instruction into a load queue in a load/store unit;
queuing a first storage access blocking instruction in a store queue in the load/store unit;
queuing a second load instruction into the load queue; and
inhibiting the access of a storage medium by the second load instruction until after completion of the first storage access blocking instruction.

8. The method as recited in claim 7, further comprising the steps of:
queuing a first store instruction subsequently to the first storage access blocking instruction; and
inhibiting the access of the storage medium by the first store instruction until after completion of the first storage access blocking instruction.

9. The method as recited in claim 7, further comprising the step of:
access of the storage medium by the first load instruction before completion of the first storage access blocking instruction.

10. The method as recited in claim 7, wherein the first storage access blocking instruction is an EIEIO instruction.

11. The method as recited in claim 7, further comprising the steps of:
queuing a second storage access blocking instruction in the store queue in the load/store unit subsequent to the first storage access blocking instruction;
queuing a third load instruction into the load queue; and
inhibiting the access of the storage medium by the third load instruction until after completion of the second storage access blocking instruction.

12. The method as recited in claim 11, further comprising the steps of:
queuing a second store instruction subsequently to the second storage access blocking instruction; and
inhibiting the access of the storage medium by the second store instruction until after completion of the second storage access blocking instruction.

13. The method as recited in claim 11, further comprising the step of:
accessing of the storage medium by the second load instruction before completion of the second storage access blocking instruction.

14. A method for executing storage access instructions in a processor, comprising the steps of:
queuing a first store instruction into a store queue in a load/store unit;
queuing a first storage access blocking instruction in a load queue in the load/store unit;
queuing a second store instruction into the store queue; and
inhibiting the access of a storage medium by the second store instruction until after completion of the first storage access blocking instruction.

15. The method as recited in claim 14, further comprising the steps of:
queuing a first load instruction subsequently to the first storage access blocking instruction; and inhibiting the access of the storage medium by of the first load instruction until after completion of the first storage access blocking instruction.

16. The method as recited in claim 15, further comprising the step of:

accessing the storage medium by the first store instruction before completion of the first storage access blocking instruction.

17. The method as recited in claim 16, wherein in the first storage access blocking instruction is an EIEIO instruction.

18. A processor comprising:

a load/store unit including a load queue and a store queue;

a cache coupled to the load/store unit;

a bus interface unit coupled to the load/store unit and adaptable for coupling to a system memory via a bus;

circuitry operable for storing a first load instruction in the load queue, wherein the first load instruction is operable for reading data from the system memory;

circuitry operable for storing an EIEIO-type instruction in the store queue;

circuitry operable for storing a second load instruction in the load queue, wherein the second load instruction is operable for reading data from the system memory; and circuitry operable for inhibiting access of the bus by the second load instruction until after the EIEIO-type instruction has completed.

19. The processor as recited in claim 18, further comprising circuitry operable for requiring the first load instruction to access the bus before the EIEIO-type instruction has completed.

20. The processor as recited in claim 18, further comprising:

circuitry operable for storing a first store instruction in the store queue in subsequent order to the EIEIO-type instruction; and circuitry operable for inhibiting access of the bus by the first store instruction until after the EIEIO-type instruction has completed.

21. The processor as recited in claim 18, further comprising:

circuitry operable for allowing a third load instruction to execute before the EIEIO-type instruction has completed, wherein the third load instruction is ordered subsequent to the EIEIO-type instruction, and wherein the third load instruction requires access to the cache.

* * * * *